(12) United States Patent
Kikuchi et al.

(10) Patent No.: US 6,878,774 B2
(45) Date of Patent: Apr. 12, 2005

(54) RESIN COMPOSITION AND MULTI-LAYER CONTAINER USING THE SAME

(75) Inventors: Atsushi Kikuchi, Yokohama (JP); Ikuo Komatsu, Yokohama (JP); Toshiki Yamada, Yokohama (JP); Yoshihiro Kitano, Yokohama (JP); Go Saito, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 287 days.

(21) Appl. No.: 10/003,228

(22) Filed: Dec. 6, 2001

(65) Prior Publication Data

US 2002/0115768 A1 Aug. 22, 2002

(30) Foreign Application Priority Data

Dec. 8, 2000 (JP) .......................... 2000-374947
Apr. 26, 2001 (JP) .......................... 2001-130181

(51) Int. Cl.[7] .............................. C08L 77/00
(52) U.S. Cl. .......................... 525/66; 525/183
(58) Field of Search .................... 525/66, 183

(56) References Cited

U.S. PATENT DOCUMENTS 6,406,766 B1 * 6/2002 Rotter et al. ............... 428/35.7
6,423,776 B1 * 7/2002 Akkapeddi et al. ........... 525/66

* cited by examiner

*Primary Examiner*—Ana L. Woodward
(74) *Attorney, Agent, or Firm*—Sughrue Mion, PLLC

(57) ABSTRACT

A resin composition obtained by blending a thermoplastic resin that can be melt-extruded at a solubility parameter of not smaller than 9.5 with an organic oxidizing component and with a transition metal catalyst, the organic oxidizing component being a polyene having a functional group on a side chain or at a terminal thereof. The resin composition has excellent moldability and gas shut-off property. A multi-layer container having an oxygen-absorbing layer of this resin composition exhibits excellent gas-barrier property and is capable of favorably preserving the content.

5 Claims, 1 Drawing Sheet

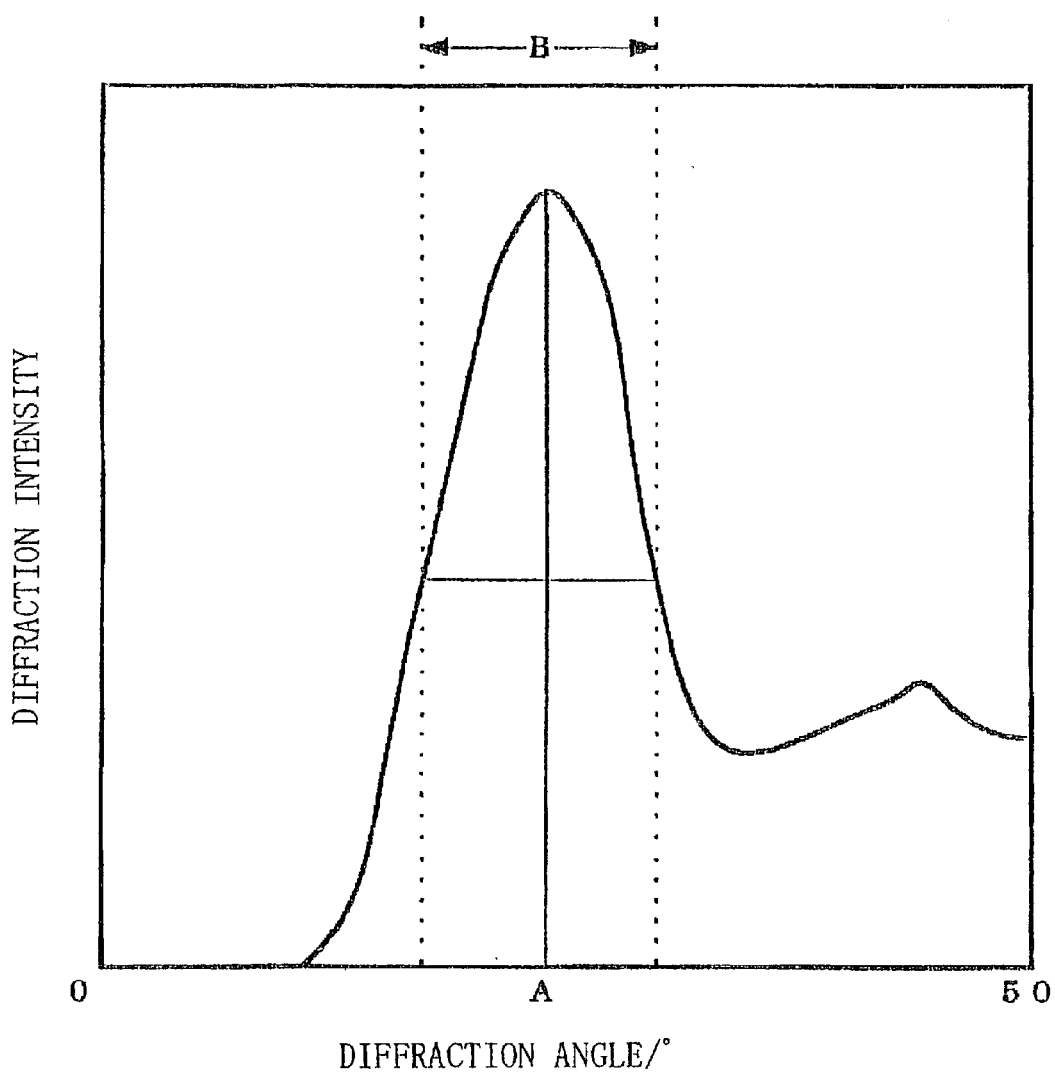

RESIN COMPOSITION AND MULTI-LAYER CONTAINER USING THE SAME

BACKGROUND OF THE INVENTION

1. Field of the Invention

The present invention relates to a resin composition having excellent moldability and gas shut-off property, and to a multi-layer container having an oxygen-absorbing layer of this resin composition.

2. Prior Art

As packaging containers, there have heretofore been used metal cans, glass bottles and a variety of plastic containers accompanied, however, by problems of disintegration of the contents and loss of flavor due to oxygen remaining in the containers and due to oxygen that enters permeating through the container walls.

In the case of the metal cans and glass bottles, quite no oxygen enters permeating through the containers walls, and only oxygen remaining in the containers could cause a problem. In the case of the plastic containers, however, oxygen enters permeating through the container walls to a degree that is no longer negligible arousing a problem from the standpoint of preserving the contents.

In order to prevent this, the plastic containers have been produced having container walls of a multi-layer structure containing at least a layer of a resin having oxygen-blocking property, such as an ethylene/vinyl alcohol copolymer.

A deoxidizing agent has long been used for removing oxygen in the containers. Japanese Examined Patent Publication (Kokoku) No. 1824/1987 discloses an invention using the deoxidizing agent for the container walls, according to which a multi-layer structure for packaging comprises, laminated one upon the other, a layer blended with the deoxidizing agent containing, as a chief agent, a reducing material such as iron powder or the like in the resin having oxygen-permeating property, and a layer having an oxygen gas shut-off property.

Japanese Examined Patent Publication (Kokoku) No. 60826/1992 proposed by the present inventors discloses a plastic multi-layer container comprising a laminated structure of:

an intermediate layer of a resin composition of a gas-barrier thermoplastic resin having an oxygen permeation coefficient at 20° C. and 0% RH of not larger than $10^{-12}$ cc·cm/cm$^2$·sec·cmHg and a water-absorbing amount at 20° C. and 100% RH of not smaller than 0.5% blended with an organometal complex of a transition metal; and layers of a moisture-resistant thermoplastic resin formed on both sides of the intermediate layer.

Japanese Patent No. 2,991,437 teaches a barrier wall for packaging including a composition of a polymer having oxygen-trapping property or including a layer of this composition, wherein the composition traps oxygen as an organic oxidizing component is oxidized with a metallic catalyst, the organic component that can be oxidized being a polyamide and, particularly, a polyamide containing a xylylene group.

A method of blending a resin with an oxygen-absorbing agent such as an iron powder to use it as a wall of the packaging material is satisfactory from the standpoint of large oxygen-absorbing ability but cannot be used in the field of packages where transparency is required since it causes the resin to be tinted in a specific hue.

On the other hand, an oxygen-absorbing resin composition containing a catalyst of the type of a transition metal is advantageous since it can be used even for the packaging containers that are substantially transparent accompanied, however, by such a defect that a base resin blended with the catalyst of the type of a transition metal is deteriorated upon the oxidation permitting the permeation of oxygen through the container wall to increase with the passage of time and, further, causing the strength of the container to decrease.

SUMMARY OF THE INVENTION

The present inventors have discovered the fact that a resin composition obtained by blending a particular thermoplastic resin with an organic oxidizing component and a transition metal catalyst, exhibits excellent moldability and excellent gas shut-off property.

Namely, it is an object of the present invention to provide a resin composition which has excellent oxygen-absorbing property and is capable of suppressing the permeation of oxygen through the resin layer for extended periods of time, and further has excellent moldability and mechanical strength.

Another object of the present invention is to provide a multi-layer container provided with a resin layer of the type of separated functions, exhibiting excellent oxygen-absorbing property as well as excellent oxygen-barrier property and strength.

A further object of the present invention is to provide a multi-layer container made of the above resin composition, exhibiting excellent oxygen-absorbing property and excellent oxygen-barrier property, and withstanding hot filling and preservation over extended periods of time.

According to the present invention, there is provided a resin composition obtained by blending a thermoplastic resin that can be melt-extruded at a solubility parameter of not smaller than 9.5 with an organic oxidizing component and with a transition metal catalyst, the organic oxidizing component being a polyene having a functional group on a side chain or at a terminal thereof.

In the resin composition of the present invention, it is desired that the thermoplastic resin is a gas-barrier resin having an oxygen permeation coefficient of not larger than 7 cc·mm/m$^2$·day·atm (20° C., 0% RH), and is, particularly, a polyamide resin or an ethylene-vinyl alcohol copolymer. Among them, it is desired that the thermoplastic resin is a xylylene group-containing polyamide resin having a concentration of amino end groups of not smaller than 40 eq/10$^6$ g.

It is further desired that the above-mentioned organic oxidizing component is a polybutadiene or a polyisoprene modified with a maleic acid or with an anhydride thereof and that the organic oxidizing component is dispersed in the thermoplastic resin, and the dispersant thereof has a minimum length of not larger than 400 nm.

Further, it is desired that the above-mentioned transition metal catalyst is an organic salt of cobalt and is contained at a concentration of not smaller than 300 ppm calculated as a metal.

According to the present invention, further, there is provided a multi-layer container having at least one oxygen-absorbing layer of the above-mentioned resin composition.

In the multi-layer container, it is desired that a layer of a polyolefin resin or of a thermoplastic polyester resin is formed on at least one side of the oxygen-absorbing layer, the thermoplastic polyester resin having a crystallinity of from 30 to 55% and a half-value width of an X-ray diffraction profile of not larger than 15.

BRIEF DESCRIPTION OF THE DRAWINGS

FIG. 1 is a graph illustrating how to find a peak A of a diffraction profile and a half-value width B from the intensity profile of the diffraction profile relying upon the X-ray analysis.

DETAILED DESCRIPTION OF THE INVENTION

The resin composition of the present invention contains a thermoplastic resin, an organic oxidizing component and a transition metal catalyst, and has a feature in the combination of the thermoplastic resin which is the one having a solubility parameter (Sp-value) of not smaller than 9.5 and is capable of being melt-extruded, and the organic component capable of being oxidized (also referred to as organic oxidizing component) which is a polyene having a functional group on a side chain or at a terminal thereof.

It is important that the thermoplastic resin used in the present invention has a solubility parameter of not smaller than 9.5 from the standpoint of gas shut-off property and strength of the resin composition.

In this specification, the solubility parameter (Sp-value) is defined to be the coagulation energy density (cal/cc) raised to the power of ½, and is intimately related to the strength of the hydrogen bond. The larger the Sp-value is, the greater the strength of the hydrogen bond is.

The thermoplastic resin used in the present invention plays the role of a principal component of the resin composition i.e., plays the role of a matrix. The thermoplastic resin that has the solubility parameter (Sp-value) lying within the above-mentioned range, exhibits a large hydrogen bond and, hence, excellent gas shut-off property.

Further, the thermoplastic resin having the solubility parameter (Sp-value) lying within the above-mentioned range, has a large coagulation energy density, enables the resin composition to exhibit a large mechanical strength, and imparts a satisfactory moldability.

In the present invention, a polyene having a functional group on a side chain or at a terminal thereof is used as an organic oxidizing component. The organic oxidizing component is oxidized solely by the action of a transition metal catalyst that will be described later to absorb oxygen. As the organic oxidizing component, there is used the one having a functional group on a side chain or at a terminal thereof so as to be favorably dispersed in the thermoplastic resin to thereby obtain excellent workability and to promote the absorption of oxygen by the oxidation of the organic oxidizing component.

In the organic oxidizing component, it is considered that hydrogen atoms are easily pulled out at positions of active carbon atoms of the organic component thereby to generate a radical. The composition containing the transition metal catalyst and the above organic oxidizing component absorbs oxygen through the oxidation of the organic component, as a matter of course. Here, it is believed that the oxidation takes place through the elementary processes of ① generation of radicals due to the pull-out of hydrogen atoms from the carbon atoms neighboring the double bond by the transition metal catalyst, ② generation of peroxy radicals due to the addition of oxygen molecules to the radicals, and ③ pull-out of hydrogen atoms by peroxy radicals.

When the transition metal catalyst is present in small amounts without causing the resin to be deteriorated even under normal condition, however, there exists an induction period for generating the radicals and for adding oxygen, from which it is considered that these elementary processes are not necessarily taking place quickly and effectively.

On the other hand, the acid-modified polyene polymer favorably used in the present invention has functional groups such as a carboxylic acid group and a carboxylic anhydride group in addition to the above-mentioned carbon atoms neighboring the double bond, and is believed to be effective in shortening the induction period.

That is, the above functional groups are all electron-attracting groups that activate the carbon atoms neighboring the double bond.

Besides, when the thermoplastic resin is blended with the functional group-containing organic oxidizing component, the acid-modified polyene polymer is favorably dispersed in the thermoplastic resin matrix enabling the resin composition to be favorably worked, which is very desirable.

That is, the unmodified polyene polymer is simply dispersed relying upon the mechanical kneading. Therefore, the dispersion is poor, the degree of dispersion is irregular, and the workability of the resin composition is inferior.

On the other hand, the functional group-containing organic oxidizing component exhibits improved affinity to the thermoplastic resin having a large Sp-value due to the presence of the above-mentioned functional groups, and favorably disperses in thermoplastic resin, enabling the resin composition to be excellently worked.

In the resin composition of the present invention as described above, the thermoplastic resin plays the role of shutting off the gases without being substantially oxidized, while the organic oxidizing component plays the role of absorbing oxygen by being oxidized; i.e., the gas shut-off property and the oxygen-absorbing property are exhibited based on the separate functions, creating a distinguished feature of the present invention.

In a dispersion structure in which the thermoplastic resin exists as a continuous phase (matrix) and the organic oxidizing component exists as a dispersion phase, in particular, the organic oxidizing component which is the dispersion phase has increased surface areas. Therefore, oxygen is efficiently absorbed. Even when the dispersion layer undergoes the oxidation, the thermoplastic resin remains as the continuous phase still exhibiting excellent gas shut-off property and mechanical strength. Further, the organic oxidizing component is covered with the continuous phase of the thermoplastic resin offering an advantage of excellent sanitation.

[Thermoplastic Resin]

The thermoplastic resin used for the resin composition of the present invention has a solubility parameter (Sp-value) of not smaller than 9.5 and is capable of being melt-extruded.

Any thermoplastic resin can be used so far as the above-mentioned conditions are satisfied. Particularly suitable examples include an ethylene-vinyl alcohol copolymer, a polyamide or a copolymer thereof, a polyester having barrier property, and combinations thereof.

As a resin having particularly excellent barrier property against oxygen and aromatic components, there can be exemplified an ethylene-vinyl alcohol copolymer, such as a saponified copolymer obtained by so saponifying an ethylene-vinyl acetate copolymer having an ethylene content of from 20 to 60 mol % and, particularly, from 25 to 50 mol % that the degree of saponification is not smaller than 96 mol % and, particularly, not smaller than 99 mol %.

The saponified ethylene-vinyl alcohol copolymer must have a molecular weight large enough for forming a film and must, desirably, have a viscosity of not smaller than 0.01 dL/g and, particularly, not smaller than 0.05 dL/g as measured in a mixed solvent of phenol and water at a weight ratio of 25:15 at 30° C.

As the polyamide resin, there can be exemplified (a) an aliphatic, an alicyclic or a semi-aromatic polyamide derived from a dicarboxylic acid component and a diamine component, and (b) a polyamide derived from an aminocarboxylic acid or a lactam thereof, or a copolyamide thereof or a blend thereof.

Examples of the dicarboxylic acid component include aliphatic dicarboxylic acids having 4 to 15 carbon atoms, such as succinic acid, adipic acid, sebacic acid, decanedicarboxylic acid, undecanedicarboxylic acid and dodecanedicarboxylic acid; and aromatic dicarboxylic acids such as terephthalic acid and isophthalic acid.

Examples of the diamine component include straight-chain or branched-chain alkylene diamines having 4 to 25 carbon atoms and, particularly, 6 to 18 carbon atoms, such as 1,6-diaminohexane, 1,8-diaminooctane, 1,10-diaminodecane and 1,12-diaminododecane; alicyclic diamines such as bis(aminomethyl)cyclohexane, bis(4-aminocyclohexyl)methane, 4,4'-diamino-3,3'-dimethyldicyclohexylmethane and, particularly, bis(4-aminocyclohexyl)methane, 1,3-bis(aminocyclohexyl)methane and 1,3-bis(aminomethyl)cyclohexane; and aroaliphatic diamines such as m-xylylene diamine and/or p-xylylene diamine.

Examples of the aminocarboxylic acid component include aliphatic aminocarboxylic acids such as ω-aminocaproic acid, ω-aminooctanoic acid, ω-aminoundecanoic acid and ω-aminododecanoic acid; and aroaliphatic aminocarboxylic acids such as para-aminomethylbenzoic acid and para-aminophenylacetic acid.

Among these polyamides, it is desired to use a xylylene group-containing polyamide. Concretely speaking, it is desired to use homopolymers such as polymetaxylyleneadipamide, polymetaxylylenesebacamide, polymetaxylylenesuberamide, polyparaxylylenepimeramide and polymetaxylyleneazeramide; copolymers such as metaxylylene/paraxylyleneadipamide copolymer, metaxylylene/paraxylylenepimeramide copolymer, metaxylylene/paraxylylenesebacamide copolymer and metaxylylene/paraxylyleneazeramide copolymer; and copolymers of these homopolymers or copolymers with an aliphatic diamine such as hexamethylenediamine, an alicyclic diamine such as piperadine, an aromatic diamine such as para-bis(2-aminoethyl)benzene, an aromatic dicarboxylic acid such as terephthalic acid, a lactam such as ω-caprolactam, an ω-aminocarboxylic acid such as 7-aminoheptanoic acid, or an aromatic aminocarboxylic acid such as para-aminomethylbenzoic acid. Among them, there can be particularly preferably used a diamine component comprising chiefly an m-xylylenediamine and/or a p-xylylenediamine, and a polyamide obtained from an aliphatic dicarboxylic acid and/or an aromatic dicarboxylic acid.

These xylylene group-containing polyamides exhibit superior oxygen-barrier property to those of other polyamide resin, and are desired for accomplishing the object of the present invention.

In the present invention, it is desired that the polyamide resin has a amino end group concentration of not smaller than 40 eq/$10^6$ g and, more preferably, not smaller than 50 eq/$10^6$ g from the standpoint of suppressing the polyamide resin from being deteriorated by oxidation.

There is a close relationship between the deterioration of the polyamide resin by oxidation, i.e., absorption of oxygen and the concentration of amino end groups of the polyamide resin. That is, when the concentration of the amino end groups of the polyamide resin is in the above-mentioned relatively high range, the rate of absorbing oxygen is suppressed to be almost zero or to be close to zero. When the concentration of the amino end groups of the polyamide resin becomes smaller than the above-mentioned range, on the other hand, the polyamide resin tends to exhibit an increased rate of absorbing oxygen.

It is desired that these polyamides, too, have molecular weights large enough for forming a film, and have relative viscosities (ηrel) of not smaller than 1.1 and, particularly, not smaller than 1.5 as measured in a concentrated sulfuric acid of a concentration of 1.0 g/dl at a temperature of 30° C.

As the thermoplastic resin, there can be used a thermoplastic polyester such as a polyethylene terephthalate derived from an aromatic dicarboxylic acid such as terephthalic acid or isophthalic acid and from diols such as ethylene glycol.

It is also possible to use a so-called gas-barrier polyester having excellent gas-barrier property.

The gas-barrier polyester contains, in a polymer chain, a terephthalic acid component (T) and an isophthalic acid component (I) at a molar ratio of T:I=95:5 to 5:95 and, particularly, 75:25 to 25:75, and contains an ethylene glycol component (E) and a bis(2-hydroxyethoxy)benzene component (BHEB) at a molar ratio of E:BHEB=99.999:0.001 to 2.0:98.0 and, particularly, 0 99.95:0.05 to 40:60. As the BREB, there can be preferably used a 1,3-bis(2-hydroxy) benzene.

It is desired that the polyester (BPR), usually, has a molecular weight at least large enough forming a film and has an intrinsic viscosity [η] of from 0.3 to 2.8 dl/g and, particularly, from 0.4 to 1.8 dl/g as measured in a mixture solvent of phenol and tetrachloroethane at a weight ratio of 60:40 at a temperature of 30° C.

It is desired that the thermoplastic resin used for the resin composition of the present invention has gas-barrier property as described above and has an oxygen permeation coefficient which is not larger than 7 cc·mm/$m^2$·day·atom (20° C., 0% RH).

[Organic Oxidizing Component]

The organic oxidizing component used in the present invention has a functional group on a side chain or at a terminal thereof and is capable of being oxidized.

The organic component capable of being oxidized desirably has active carbon atoms enabling hydrogen to be easily pulled out. Though there is no particular limitation, such active carbon atoms may be those carbon atoms neighboring the carbon-carbon double bond, tertiary carbon atoms to which a carbon side chain is bonded or active methylene groups.

As the functional group existing on a side chain or at a terminal, there can be exemplified carboxylic acid group, carboxylic anhydride group, group of carboxylate, group of carboxylic acid ester, group of carboxylic acid amide, carbonyl group and hydroxyl group.

As the organic oxidizing component, there can be used a polyene oligomer or a polymer modified with an acid or an acid anhydride.

As the polyene, there can be preferably used a polyene having 4 to 20 carbon atoms or a resin containing a unit derived from a chain-like or cyclic conjugated or non-conjugated polyene.

As these monomers, there can be exemplified conjugated dienes such as butadiene and isoprene; chain-like non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene and 7-methyl-1,6-octadiene; cyclic non-conjugated dienes such as methyltetrahydroindene, 5-ethylindene-2-norbornene, 5-methylene-2-norbornene, 5-isopropylindene-2-norbornene, 5-vinylindene-2-norbornene, 6-chloromethyl-5-isopropenyl-2-norbornene and dicyclopentadiene; and trienes and chloroprenes such as 2,3-diisopropylindene-5-norbornene, 2-ethylindene-3-isopropylindene-5-norbornene and 2-propenyl-2,2-norbornadiene.

These polyenes are incorporated in a homopolymer, in a random copolymer or in a block copolymer in a single kind, in a combination of two or more kinds or in a combination with other monomers.

As a monomer used in combination with the polyene, there can be used α-olefins having 2 to 20 carbon atoms, such as ethylene, propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, and 12-ethyl-1-tetradecene. There can be further used monomers such as styrene, vinyltoluene, acrylonitrile, methacrylonitrile, vinyl acetate, methyl methacrylate and ethyl acrylate.

Concrete examples of the polyene polymers include polybutadiene (BR), polyisoprene (IR), butyl rubber (IIR), natural rubber, nitrile-butadiene rubber (NBR), styrene-butadiene rubber (SBR), chloroprene rubber (CR), and ethylene-propyrene-diene rubber (EPDM), which, however, are in no way to limit the scope of the invention.

There is no particular limitation on the carbon-carbon double bond in the polymer which may exist in the form of vinylidene group in the main chain or in the form of a vinyl group in the side chain.

It is desired that the polyene polymer has a carboxylic acid group, a carboxylic anhydride group or a hydroxyl group that is introduced therein. As a monomer for introducing these functional groups, there can be used an ethylenically unsaturated monomer having the above-mentioned functional groups.

As the monomer, it is desired to use an unsaturated carboxylic acid or a derivative thereof. Concrete examples include α,β-unsaturated carboxylic acids such as acrylic acid, methacrylic acid, maleic acid, fumaric acid, itaconic acid, citraconic acid and tetrahydrophthalic acid; unsaturated carboxylic acids such as bicyclo[2,2,1]hepto-2-en-5,6-dicarboxylic acid; α,β-unsaturated carboxylic anhydrides such as maleic anhydride, itaconic anhydride, citraconic anhydride, and tetrahydrophthalic anhydride; and unsaturated carboxylic anhydrides such as bicyclo[2,2,1]hepto-2-en-5,6-dicarboxylic anhydride.

The polyene polymer modified with an acid is prepared by using a resin having a carbon-carbon double bond as a base polymer, and graft-copolymerizing the base polymer with an unsaturated carboxylic acid or with a derivative thereof by known means. The polyene polymer modified with an acid can be further prepared by random-copolymerizing the above-mentioned polyene with an unsaturated carboxylic acid or with a derivative thereof.

It is desired that the acid-modified polyene polymer particularly suited for achieving the object of the present invention contains an unsaturated carboxylic acid or a derivative thereof in an amount of from 0.01 to 10% by weight.

When the content of the unsaturated carboxylic acid or the derivative thereof lies within the above-mentioned range, the acid-modified polyene polymer disperses well in the thermoplastic resin and, besides, oxygen is smoothly absorbed.

A polyene polymer modified with a hydroxyl group and having the hydroxyl group at the terminal, can also be favorably used.

It is desired that the polyene polymer used in the present invention has a viscosity that lies in a range of from 1 to 200 Pa·s at 40° C. from the standpoint of workability of the oxygen-absorbing resin composition.

[Transition Metal Catalyst]

As the transition metal catalyst used in the present invention, it is desired to use a metal component of the Group VIII of periodic table, such as iron, cobalt or nickel, as well as a metal of the Group I, such as copper or silver, a metal of the Group IV, such as tin, titanium or zirconium, a metal of the Group V, such as vanadium, a metal of the Group VI, such as chromium and a metal of the Group VII, such as manganese. Among these metals, cobalt absorbs oxygen at a large rate and is particularly suited for accomplishing the object of the present invention.

The transition metal catalyst is usually used in the form of an inorganic acid salt, an organic acid salt or a complex of a low valency of the above-mentioned transition metals.

As the inorganic acid salt, there can be exemplified a halide such as chloride, an oxyacid salt of sulfur such as sulfate, an oxyacid salt of nitrogen such as nitrate, an oxyacid salt of phosphorus such as phosphate, and a silicate.

As the organic acid salt, there can be exemplified a carboxylate, a sulfonate and a phosphonate. Among them, the carboxylate is suited for the object of the present invention. Concrete examples thereof include transition metal salts such as of acetic acid, propionic acid, isopropionic acid, butanoic acid, isobutanoic acid, pentanoic acid, isopentanoic acid, hexanoic acid, heptanoic acid, isoheptanoic acid, octanoic acid, 2-ethylhexanoic acid, nonanoic acid, 3,5,5-trimethylhexanoic acid, decanoic acid, neodecanoic acid, undecanoic acid, lauric acid, myristic acid, palmitic acid, margaric acid, stearic acid, arachic acid, linderic acid, tsuzuic acid, petroceric acid, oleic acid, linolic acid, linoleic acid, arachidonic acid, formic acid, oxalic acid, sulfamic acid, and naphthenic acid.

As the complex of the transition metal, on the other hand, there can be used a complex with a β-diketone or a β-keto-acid ester. As the β-diketone or the β-keto-acid ester, there can be used, for example, acetylacetone, acetoethyl succinate, 1,3-cyclohexadion, methylene bis-1,3-cyclohexadion, 2-benzyl-1,3-cyclohexadione, acetyltetralone, palmitoyltetralone, stearoyltetralone, benzoyltetralone, 2-acetylcyclohexanone, 2-benzoylcyclohexanone, 2-acetyl-1,3-cyclohexanedion, benzoyl-p-chlorobenzoylmethane, bis(4-methylbenzoyl) methane, bis(2-hydroxybenzoyl)methane, benzoylacetone, tribenzoylmethane, diacetylbenzoylmethane, stearoylbenzoylmethane, palmitoylbenzoylmethane, lauroylbenzoylmethane, dibenzoylmethane, bis(4-chlorobenzoyl)methane, bis(methylene-3,4-dioxybenzoyl) methane, benzoylacetylphenylmethane, stearoyl(4-methoxybenzoyl)methane, butanoylacetone, distearoylmethane, acetylacetone, stearoylacetone, bis (cyclohexanoyl)-methane and dipivaloylmethane.

[Resin Composition]

It is desired that the resin composition of the resent invention contains the organic oxidizing component in an amount of from 0.01 to 10% by weight and, particularly, from 1.0 to 7% by weight.

It is further desired that the resin composition contains a transition metal catalyst in an amount of at least 300 ppm and, particularly, from 310 to 800 ppm calculated as a transition metal.

When the amount of the organic oxidizing component is smaller than the above-mentioned range, the oxygen-absorbing property tends to be deteriorated as compared with when the amount of the organic oxidizing component lies within the above-mentioned range. When the amount of the organic oxidizing component becomes more than the above-mentioned range, on the other hand, no distinguished advantage is obtained concerning the oxygen-absorbing property, and the resin composition exhibits decreased strength, deteriorted gas shut-off property and poor moldability, which is not desirable.

When the amount of the transition metal caalyst becomes smaller than the above-mentioned range, the oxygen-absorbing property tends to be deteriorated as compared with when the amount of the transition metal catalyst lies within the above-mentioned range. When the amount of the transition metal catalyst exceeds the above-mentioned range, on the other hand, the resin composition tends to be deteriorated, which is not desirable, either.

The thermoplastic resin can be blended with the organic oxidizing component and with the transition metal catalyst by a variety of means. They can be blended in any order without limitation.

For example, the thermoplastic resin is dry-blended or melt-blended with the organic oxidizing component so as to easily prepare a blend of the two. The transition metal catalyst, on the other hand, is used in a small amount compared to the thermoplastic resin or the organic oxidizing component. In order to accomplish the homogeneous blending, therefore, the transition metal catalyst is usually dissolved in an organic solvent, and the solvent and the powdery or granular thermoplastic resin as well as the oxidizing polymer are mixed together, and, as required, the mixture is dried in an inert atmosphere.

As the solvent for dissolving the transition metal catalyst, there can be used an alcohol solvent such as methanol, ethanol or butanol; an ether solvent such as dimethyl ether, diethyl ether, methyl ethyl ether, tetrahydrofurane or dioxane; a ketone solvent such as methyl ethyl ketone or cyclohexanone; or a hydrocarbon solvent such as n-hexane or cyclohexane. In general, the transition metal catalyst is dissolved at a concentration of from 5 to 90% by weight.

It is desired that the mixing of the thermoplastic resin, organic oxidizing component and transition metal catalyst and the subsequent preservation thereof, are conducted in a non-oxidizing atmosphere such that the composition is not oxidized in the preceding stage. For this purpose, it is desired to mix and dry them under a reduced pressure or in a nitrogen stream.

The mixing and drying can be executed by using an extruder or an injection machine which is of the ventilation type or is equipped with a dryer in a step preceding the molding step.

It is further allowable to prepare a master batch of a thermoplastic resin and/or an oxidizing polymer containing the transition metal catalyst at a relatively high concentration, and dry-blend the master batch with a non-blended thermoplastic resin, thereby to prepare an oxygen-absorbing resin composition of the present invention.

According to the present invention, the polyamide resin is used as the thermoplastic resin after being dried under generally employed drying conditions of a temperature of from 120 to 180° C. under a pressure of from 0.5 to 2 mmHg for 2 to 6 hours.

Though generally not required, the resin composition of the present invention may, as desired, be blended with a known activating agent. Preferred examples of the activating agent include polyethylene glycol, polypropylene glycol, ethylene-vinyl alcohol copolymer, ethylene-methacrylic acid copolymer, and hydroxyl group- and/or carboxyl group-containing polymers such as various ionomers.

These hydroxyl group- and/or carboxyl group-containing polymers can be blended in an amount of not larger than 30 parts by weight and, particularly, in an amount of from 0.01 to 10 parts by weight per 100 parts by weight of the thermoplastic resin.

The resin composition of the present invention may be blended with filler, coloring agent, heat-resistant stabilizer, weather-resistant stabilizer, anti-oxidant, anti-aging agent, photo stabilizer, ultraviolet ray-absorbing agent, anti-static agent, lubricating agent such as metal soap or wax, and a resinous blending agent such as resin or rubber for reforming according to known recipe.

By being blended with, for example, the lubricating agent, biting of the resin by the screw is improved. As the lubricating agent, there are generally used metal soaps such as magnesium stearate and calcium stearate, those of hydrocarbons, such as fluidized, natural or synthetic paraffin, microwax, polyethylene wax and chlorinated polyethylene wax, those of the aliphatic acid, such as stearic acid and lauric acid, those of the aliphatic acid monoamide or bisamide, such as stearic acid amide, palmitic acid amide, oleic acid amide, methylenebis stearo amide and ethylenebis stearo amide, those of the esters, such as butyl stearate, cured castor oil and ethylene glycol monostearate, and those of alcohols, such as cetyl alcohol and stearyl alcohol, as well as a mixed system thereof. It is desired that the lubricating agent is added in an amount of from 50 to 1000 ppm on the basis of the thermoplastic resin.

After melt-blended, the thermoplastic resin is existing as a continuous phase (matrix) and the organic oxidizing component is existing as a dispersion phase in the resin composition of the present invention.

It is desired that the organic oxidizing component forming the dispersion phase has a minimum length which is not longer than 400 nm from the standpoint of oxygen absorption and moldability.

The minimum length of the dispersant stands for a length of a portion where the gap becomes the smallest between the two parallel lines in which the dispersant is sandwiched in contact therewith.

Namely, when the paticle diameter of the dispersant becomes larger than the above range, the oxygen-absorbing property is deteriorated as compared to when the particle diameter thereof lies within the above range, and the moldability and transparency are deteriorated, too.

[Multi-layer Container]

The present invention uses at least one oxygen-absorbing layer comprising the above-mentioned resin composition and, as required, at least one another layer of another resin in combination to obtain such containers as cups, trays, bottles, tubular containers and closures.

It is generally desired that the oxygen-absorbing resin composition layer is formed on the inner side of the outer surface of the container so will not to be exposed to the outer surface, and is formed on the outer side of the inner surface of the container so will not to come in direct contact with the content. Thus, it is desired that the oxygen-absorbing layer is formed as at least one intermediate layer of the multi-layer container.

In the case of the multi-layer container, the other resin layer formed in combination with the oxygen-absorbing layer will be a humidity-resistant resin or a barrier resin, such as olefin resin or thermoplastic polyester resin.

Examples of the olefin resin include low-density polyethylene (LDPE), intermediate-density polyethylene (MDPE), high-density polyethylene (HDPE), linear low-density polyethylene (LLDPE) and linear very-low-density polyethylene (LVLDPE), as well as polypropylene (PP), ethylene-propylene copolymer, polybutene-1, ethylene-butene-1 copolymer, propyrene-butene-1 copolymer, ethylene-propylene-butene-1 copolymer, ethylene-vinyl acetate copolymer, jonically crosslinked olefin copolymer (ionomer) or blends thereof.

Examples of the thermoplastic polyester resin include polyethylene terephthalate (PET), polybutylene terephthalate (PBT), polyethylene naphthalate (PEN), copolymerized polyesters thereof and blends thereof.

The most preferred example of the gas-barrier resin will be an ethylene-vinyl alcohol copolymer (EVOH) which is a saponified copolymer obtained by, for example, saponifying an ethylene-vinyl acetate copolymer containing an ethylene in an amount of from 20 to 60 mol % and, particularly, from 25 to 50 mol % to a saponification degree of not lower than 96 mol % and, particularly, not lower than 99 mol %. The saponified ethylene-vinyl alcohol copolymer must have a molecular weight large enough for forming a film and must, generally, have a viscosity of not smaller than 0.01 dl/g and, particularly, not smaller than 0.05 dl/g as measured in a mixed solvent of phenol and water at a weight ratio of 85:15 at a temperature of 30° C.

As the barrier resin, there can be further used a cyclic olefin copolymer (COC) and, particularly, a copolymer of ethylene and cyclic olefin and, especially, the APEL manufactured by Mitsui Kagaku Co.

Described below are preferred examples of the laminated-layer structure with the oxygen-absorbing resin composition layer (hereinafter simply referred to as oxygen-absorbing layer) being expressed as OAR. Which layer be formed on the inner side can be freely selected depending upon the object.

Two-layer structure: PET/OAR, PE/OAR, PP/OAR

Three-layer structure: PE/OAR/PET, PET/OAR/PET, PE/OAR/PP, EVOH/OAR/PET, PE/OAR/COC Four-layer structure: PE/PET/OAR/PET, PE/OAR/EVOH/PET, PET/OAR/EVOH/PET, PE/OAR/EVOS/COC Five-layer structure: PET/OAR/PET/OAR/PET, PE/PET/OAR/EVOH/PET, PET/OAR/EVOH/COC/PET, PET/OAR/PET/COC/PET, PE/OAR/EVOH/COC/PET Six-layer structure: PET/OAR/PET/OAR/EVOH/PET, PE/PET/OAR/COC/EVOH/PET, PET/OAR/EVOH/PET/COC/PET Seven-layer structure: PET/OAR/COC/PET/EVOH/OAR/PET In preparing the laminated-layer structure, an adhesive resin may, as required, be interposed among the resin layers.

As the above-mentioned adhesive resin, there can be exemplified a thermoplastic resin containing a carbonyl (—CO—) group based on carboxylic acid, carboxylic anhydride, carboxylate, carboxylic acid amide or carboxylic acid ester on the main chain or on the side chain at a concentration of 1 to 700 milliequivalents (meq)/100 g of the resin and, particularly, at a concentration of 10 to 500 meq/100 g of the resin. Preferred examples of the adhesive resin include ethylene-acrylic acid copolymer, jonically crosslinked olefin copolymer, maleic anhydride-grafted polyethylene, maleic anhydride-grafted polypropylene, acrylic acid-grafted polyolefin, ethylene-vinyl acetate copolymer, copolymerized polyester and copolymerized thermoplastic resin, which may be used in one kind or in a combination of two or more kinds. These resins are useful for laminating the layers by the simultaneous extrusion or by the sandwich lamination.

The pre-formed gas-barrier resin film and the humidity-resistant resin film are adhered and laminated by also using a thermosetting adhesive resin such as isocyanate or epoxy.

In the multi-layer container having the oxygen-absorbing layer comprising resin composition of the present invention, there is no particular limitation on the thickness of the oxygen-absorbing layer. Generally, however, it is desired that the thickness of the oxygen-absorbing layer is in a range of from 1 to 100 μm and, particularly, from 5 to 50 μm. Namely, when the thickness of the oxygen absorbing layer becomes smaller than a given range, the oxygen-absorbing performance is deteriorated.

Even when the thickness of the oxygen absorbing layer becomes larger than the given range, on the other hand, no distinguished advantage is obtained concerning the oxygen-absorbing performance but the amount of the resin increases bringing about disadvantage in economy and container properties such as drop in the flexibility and softness of the materials.

The total thickness of the multi-layer packaging material of the present invention may differ depending upon the use but is, usually, from 30 to 7000 μm and, particularly, from 50 to 5000 μm. It is, on the other hand, desired that the thickness of the oxygen-absorbing intermediate layer is from 0.5 to 95% and,particularly, from 1 to 50% of the whole thickness.

The multi-layer container of the present invention can be produced by a known method except the use of the oxygen-absorbing layer of the above-mentioned resin composition.

For example, the film, sheet or tube is formed by melt-kneading the above-mentioned resin composition by using the extruder and, then, extruding it into a desired shape through a T-die or a circular die (ring die). Namely, a T-die method film and a blown film are obtained. The T-die film is biaxially stretched to obtain a biaxially stretched film.

The resin composition is melt-kneaded by using the injection machine and is, then, injected into an injection metal mold to obtain a container and a preform for producing the container.

Further, the resin composition is extruded into a predetermined molten resin mass through the extruder and is compression-molded in a metal mold to obtain the container or the preform for producing the container.

The molded article may assume the shape of a film, a sheet, a parison or a pipe for forming bottles and tubes, and a preform for producing bottles and tubes.

The bottle is easily formed from the parison, pipe or preform by pinching off the extruded article by using a pair of split molds and by blowing a fluid therein.

The pipe or the preform that is cooled is, then, heated at a stretching temperature, stretched in the axial direction through one step or many steps, and is blow-stretched in the circumferential direction with the fluid pressure to obtain a stretch-blown bottle.

Further, the film or the sheet is subjected to vacuum-molding, pressurized air-molding, stretch-molding or plug-assisted molding to obtain packaging containers of the shape of cups and trays as well as a closure member of a film or a sheet.

The packaging materials such as films can be used as packaging bags of a variety of forms and can be produced by a known bag-producing method. Examples include ordinary pouches which are sealed along the three sides or the four sides, pouches with a cassette, standing pouches and pillow packaging bags, to which only, however, the invention is in no way limited.

The multi-layer extrusion-molded article can be produced relying upon a known co-extrusion molding method, i.e., by conducting the extrusion-molding in the same manner as described above but using extruders in a number corresponding to the kinds of the resins and using multi-layer multiple dies.

Further, the multi-layer injection-molded article can be produced relying upon the co-injection method or the sequential injection method by using injection molding machines in a number corresponding to the kinds of the resins.

The multi-layer film and the multi-layer sheet can be produced relying upon the extrusion coating method or the sandwich lamination. The multi-layer film or the sheet can also be produced by dry-laminating the films that have been formed in advance.

In the resin composition of the present invention, it is desired to use a xylylene group-containing polyamide resin as the thermoplastic resin as described above. In the multi-layer container having the oxygen-absorbing layer of the resin composition using the xylylene group-containing polyamide resin, it is desired that the exothermic peak of the polyamide resin due to the crystallization is not larger than 10 J/g as measured by using the differential scanning calorimeter (DSC) and a half-value width of a maximum value of a peak profile at $2\theta=0$ to 100 degrees is not larger than 10 degrees as measured by the X-ray analysis. This makes it possible to suppress a change in the structure of the xylylene group-containing polyamide during the preservation of the container or after the heat treatment of the container and, hence, to maintain a b-value of the container due to haze and color-difference meter at the initial value.

In the multi-layer container of the present invention, it is desired that a layer of a thermoplastic polyester resin is formed on at least one side of the oxygen-absorbing layer or, preferably, as an inner layer and as an outer layer. Here, it is desired that the crystallinity of the thermoplastic polyester resin layer is from 30 to 55% and/or that the half-value width of the X-ray diffraction profile is not larger than 15°.

Upon selecting the crystallinity of the thermoplastic polyester resin layer forming the inner layer and/or the outer layer of the container to be from 30 to 55%, it is made possible to prevent the deformation at the time of hot-filling the content and during the subsequent cooling. In particular, a high degree of crystallization of the inner and outer layers makes it possible to improve the barrier property, suppress the loss of properties of the oxygen-absorbing layer before filling the content, and decrease the amount of oxygen permeation after the content is filled. Besides, the outer surface that is highly crystallized is not get scarred easily.

A peak and a half-value width of an X-ray diffraction profile of the layer of the thermoplastic polyester resin will now be described with reference to FIG. 1.

In FIG. 1, the ordinate represents the intensity of diffraction and the abscissa represents the angle of diffraction. When the inner layer and the outer layer are separated from each other, and an X-ray is permitted to fall thereon in the direction of thickness, a peak A° in the diffraction profile due to X-ray diffraction is detected near a particular diffraction angle ($2\theta$). The angle of diffraction differs depending upon the kind of the thermoplastic polyester but lies in a range of from 15° to 25°, and a peak A° in the diffraction profile is detected near 21° in the case of the polyethylene terephthalate. A half-value width B° is a gap between the two points at where a parallel line intersects the peaks of the diffraction profile, the parallel line being drawn in parallel with the abscissa passing through a point which is one-half the intensity of the peak A° of the diffraction profile.

The smaller the half-value is, the larger the orientation is. Upon selecting the half-value width of the inner and outer layers of at least the container barrel portion to be not larger than 15°, the layer and, particularly the inner layer and/or the outer layer of the thermoplastic polyester resin exhibit improved gas-barrier property, the water of the content arrives little at the oxygen-absorbing layer between the inner layer and the outer layer, preventing a drop in the gas-barrier property caused by the absorption of humidity by the oxygen-absorbing layer.

Further, when oxygen infiltrates from the external side and when the content is a carbonated beverage, the carbonic acid gas is prevented from flowing to the outer side.

The packaging material of the present invention is useful as a container capable of preventing a decrease in the flavor of the content caused by oxygen.

Examples of the content that can be filled include beverages such as beer, wine, fruit juice, carbonated soft drinks, foods such as fruits, nuts, vegetables, meet products, infant's foods, coffee, jam, mayonnaise, ketchup, edible oils dressings, sauces, foods boiled in soy and milk products, as well as medicines, cosmetics and gasoline, that are subject to be degraded in the presence of oxygen, which, however, are in no way to limit the scope of the present invention.

EXAMPLES

The present invention will now be described by way of Examples to which only, however, the invention is in no way limited. The evaluation is based on the methods described below. (1) Measurement of the amount of oxygen permeating through the multi-layer film and the multi-layer container ① A PP/steel foil-laminated cup-like container (HIRETOFLEX manufactured by Toyo Seikan Co.) having a content of 52.0 ml was filled with 1 cc of water, and was heat-sealed with a closure of a multi-layer film in a nitrogen atmosphere. The cup was not treated or was boiled at 95° C. for 30 minutes, and was preserved at 30° C.·80% RH. The concentration of oxygen in the cup was measured by using a gas chromatography (GC-8AIT, GC-3BT, both manufactured by Shimazu Seisakusho Co., detector: TCD (100° C.), column: molecular sieve 5A (60° C.), carrier gas: argon), and the amount of oxygen that has permeated through was calculated from the concentration of oxygen.

② A multi-layer container was filled with 3 cc of water and was heat-sealed with an aluminum-containing closure member in a nitrogen atmosphere. The multi-layer container was not treated or was boiled at 85° C. for 30 minutes, and was preserved at 30° C.·80% RH. The concentration of oxygen in the multi-layer container was a measured by using the above gas chromatography, and the amount of oxygen that has permeated through was calculated from the concentration of oxygen. (2) Measurement of the concentration of oxygen dissolved in the multi-layer container The bottle was filled with ultra-pure water heated at 93° C. leaving a head space of 15 ml, sealed with a cap, and was immersed in a hot water bath maintained at 77° C. for 5 minutes. The multi-layer bottle filled with ultra-pure water was taken out from the hot water bath, and was allowed to naturally cool all night at normal temperature and under normal pressure. Then, the ultra-pure water in the bottle was drained. Thereafter, the multi-layer bottle was filled with oxygen-free water while blowing a nitrogen gas therein, and was sealed with an aluminum cap without permitting air bubbles to enter therein. The multi-layer bottle was preserved at 55° C., and the concentration of oxygen dissolved in the water in the multi-layer bottle was measured by using an instrument for measuring the concentration of oxygen dissolved in water (oxygen indicator: Orbisphere Laboratories). (3) Measurement of the amount of oxygen absorbed.

An oxygen-absorbing film was cut into a size of 35 cm$^2$, introduced into the HIRETOFLEX (HR78-84W, manufactured by Toyo Seikan Co.) container having a volume of 60 ml, which was, then, heat-sealed with an aluminum-containing closure member and was preserved under a condition of 23° C. or 50° C. After preserved for a predetermined period of time, concentration of oxygen was measured by using a gas chromatography (GC-8AIT, GC-3BT, both manufactured by Shimazu Seisakusho Co., detector: TCD (100° C.), column: molecular sieve 5A (60° C.), carrier gas: argon). The absorbed amount per a gram of the oxygen-absorbing composition was calculated from the concentration of oxygen, and was regarded to be the absorbed amount of oxygen. (4) Observation of dispersion of unsaturated double-bonded polymer in the thermoplastic resin A sample piece including an oxygen-absorbing layer and measuring 3 mm wide and 12 mm long was cut out from a panel portion of the multi-layer bottle or from the multi-layer film, and was buried and solidified in an epoxy resin by using a silicon mold. The sectional surface of the oxygen-absorbing layer was exposed by using the microtome, and the exposed surface only was washed with chloroform (special grade for high-speed liquid chromatograph: produced by Kishida Kagaku Co.) with stirring for one hour, dried for 12 hours, and was pre-treated by being deposited with Pt in vacuum with 10 mA for one minute. The sectional surface of the pre-treated bottle was observed by using a scanning electron microscope (JSM-6300F: manufactured by Nihon Denshi Co.) with an acceleration voltage of 10 kV. Measurement of the Amino end group concentration (AEG)

0.6 Milligrams of the sample was dissolved in 50 ml of a phenol/ethanol mixed solution (volume ratio of 4/1), and was titrated with stirring while adding 20 ml of an ethanol/water mixed solvent (volume ratio of 3/2). A 1/200 N ethanol hydrochloride/water mixed normal solution (volume ratio of 1/9) was used as a titration solution, and a methyl orange was used as an indicator. Further, the same operation was carried out without adding sample to conduct blank measurement.

The amino end group concentration (AEG) was found from the amount of titration in compliance with the following formula. When a transition metal catalyst was contained in the sample, AEG' was found by titration by dissolving the catalyst of the same amount only and was subtracted to find the AEG of the sample.

$$AEG(eq/10^6 \text{ g}) = [\{(V-V_0) \times N \times f\}/W] \times 10^3 - AEG'$$

V: amount (ml) of the 1/200 N ethanol hydrochloride/water mixed normal solution (volume ratio of 1/9) used for titrating the sample, $V_0$: amount (ml) of the, 1/200 N ethanol hydrochloride/water mixed normal solution (volume ratio of 1/9) used for the blank titration, N: normality of ethanol/water mixed normal solution, f: factor of the normal solution, W: sample weight (g), AEG': correction value (when the sample contains a transition metal catalyst).

(6) X-ray diffraction measurement

The polymer layer measuring 50 mm high (direction of the bottle height and 10 mm wide (circumferential direction of the bottle) was cut out from the barrel portion of the multi-layer bottle to use it as a sample which was measured for its diffraction profile by using a micro x-ray diffraction apparatus (PSPC-150C: manufactured by Rigaku Denki Co.). The x-ray was focused into a fine beam by using a collimator, and was projected onto the surface of the sample perpendicularly thereto. Measurement was taken by so setting that the direction of height of the bottle was at right angles (direction of height), and in parallel (circumferential direction), with the optical axis of the X-ray and with the plane inclusive of a curved PSPC (position sensitive proportional counter, Bragg angle 2θ=0 to 100°). The scattering of the air was subtracted from the obtained X-ray diffraction profile to find a diffuse scattering peak and a half-value width.

(7) Crystallinity x

A narrow piece (about 2 mm×2 mm) of a sample to be measured was sedimented in a water-calcium nitrate density-gradient tube set at 20° C. to measure a specific gravity d from a position at where the sample becomes stationary.

The crystallinities x were calculated from the measured specific gravities d in compliance with the following formula.

$$(1/d) = [(1-x)/da] + (x/dc)$$

where da is a specific gravity (da=1.335) of when x is 0%, and dc is a specific gravity (dc=1.455) of when x is 100%.

(8) Load at yielding point y

The polyester layer to be measured was cut into a short strip (5 mm×5 mm) and was measured by using the Tensilon [UCT-5T manufactured by Orientek Co.] equipped with a load cell of 100 kgf under the conditions of 23° C., 50% RH, a measuring length of 20 mm and a pulling rate of 30 mm/min.

A value of a maximum point appearing first from the start of measurement was regarded to be the load at yielding point.

(9) Heat resistance (heat shrinking factor) S of the container

A sample bottle to be measured was fully filled with the tap water of a temperature of 20° C. to measure the fully filled volume of the sample bottle ($V_0$, unit in ml) in advance.

The container was then filled with hot water heated at 85° C., so that head space is formed in neck portion, capped, and was left to cool until the content (tap water) returned to room temperature (20° C.) to evaluate the deformation.

Then, the content was removed from the sample bottle. The sample bottle was fully filled again with tap water of a temperature of 20° C. to measure the fully filled volume ($V_1$, unit in ml).

Heat resistance (heat deformation factor) S (unit in %) of the container was calculated according to the following formula, $$S = 100 \times (1 - V_1/V_0)$$

Five bottles were measured for each kind, and the heat deformation factor S was found from an arithmetical mean value of the results of the five bottles for each kind.

Example 1

A polymetaxylyleneadipamide (MXD6) resin (T-600: produced by Toyoboseki Co.) having a solubility parameer (Sp-value) of 11.6 and a amino end group concentration of 87 eq/10$^6$ g as a thermoplastic resin and a cobalt neodecanoate (DICANATE5000: produced by Dainihon Ink Kagaku Kogyo Co.) having a cobalt content of 14% as a transition metal catalyst, were mixed together by using a tumbler so that the cobalt neodecanoate deposited on the surfaces of the MXD6 in an amount of 400 ppm calculated as cobalt. Then, the MXD6 resin on which cobalt has been deposited was extruded through a twin-screw extruder having a screw 37 mm in diameter while adding dropwise thereto a maleic acid-modified polybutadiene (M-2000-20, produced by Nihon Sekiyu Kagaku Co.) as an organic oxidizing component by using a liquid feeder, thereby to obtain an oxygen-absorbing resin composition containing the cobalt neodecanoate in an amount of 400 ppm calculated as cobalt and the maletic acid-modified polybutadiene in an amount of 5% by weight. The resin composition was fed into a T-die extruder to form an oxygen-absorbing film having a thickness of 20 μm at a molding temperature of 260° C. The above film was laminated by using a multi-coater to obtain a multi-layer film of a constitution of 12-μm PET/20-μm oxygen-absorbing film/50-μm PP. A cup sealed with the above multi-layer film as a closure member was boiled at 95° C. for 30 minutes and was preserved at 30° C. and 80% RH for 30 days to measure the amount of oxygen that has permeated into the container. The oxygen-absorbing film was confirmed for its easiness of formation, measured for its minimum length of dispersant and the amount of oxygen permeation. The results were as shown in Table 1.

Comparative Example 1

An oxygen-absorbing film was prepared under the same conditions as those of Example 1 but using a polybutadiene (B-2000, produced by Nihon Sekiyu Kagaku Co.) as an organic oxidizing component. However, gel was formed so much that a film could not be obtained, and mo measurement was taken.

Comparative Example 2

An oxygen-absorbing film and a multi-layer film were prepared in the same manner as in Example 1 but using a polypropylene (PP) (Novak PPFG3D, produced by Nihon Polychem Co.) having a solubility parameter of 7.9 as a thermoplastic resin and effecting the molding at a temperature of 230° C., and were confirmed and measured in the same manner. The results were as shown in Table 1.

Comparative Example 3

An oxygen-absorbing film and a multi-layer film were prepared in the same manner as in Example 1 but using a polyethylene (PE) (Sumikasen L705, produced by Sumitomo Kagaku Co.) having a solubility parameter of 8.0 as a thermoplastic resin and effecting the molding at a temperature of 180° C., and were confirmed and measured in the same manner as in Example 1. The results were as shown in Table 1.

TABLE 1

| | Film formation note 1) | $O_2$ permeation (cc/cup) note 3) | Minimum length of dispersant (nm) |
|---|---|---|---|
| Example 1 | ○ | 0.0004 | ≦400 |
| Comp. Ex. 1 | X (gelled) | — | note 2) |
| Comp. Ex. 2 | ○ | 5.0991 | ≦400 |
| Comp. Ex. 3 | ○ | 4.8875 | ≦400 | note 1) ○: favorably formed, good appearance X: poorly formed, poor appearance
note 2) gels of the order of microns were formed much.
note 3) measured in compliance with (1)-① above.

Example 2

A polyethylene terephthalate (PET) (J-125T, produced by Mitsui Kagaku Co.) was fed into an injector for forming inner and outer layers, and the resin composition prepared in Example 1 containing the MXD6, the cobalt neodecanoate and the maleic acid-modified polybutadiene, was fed into an injector for forming an intermediate layer, to co-injection mold them in an injection metal mold under the conditions of an injection nozzle temperature of 280° C. and a resin pressure of 250 kgf/cm$^2$ to obtain a two-material-three-layer preform having the inner and outer layers of PET, the intermediate layer of the oxygen-absorbing resin composition used in Example 1, and a weight of 32 g, the intermediate layer having a volume ratio of 6%. The preform was heated at 110° C. higher than the glass transition point of PET and was biaxially stretched and blow-molded in a metal mold heated at 150° C. to obtain a two-material-three-layer bottle having a volume of 500 cc. The multi-layer preform and the multi-layer bottle were confirmed for their moldability, and were measured for their minimum length of dispersant thereof and the concentration of oxygen dissolved in the multi-layer bottle after preserved at 55° C. for 28 days. The results were as shown in Table 2.

Example 3

A multi-layer preform and a multi-layer bottle were obtained in the same manner as in Example 2 but using an ethylene-vinyl alcohol copolymer (EVOH) (EP-F101B, produced by Kuraray Co.) having a solubility parameter of 11.1 and an ethylene content of 32 mol % as a thermoplastic resin, and were confirmed and measured in the same manner. The results were as shown in Table 2.

Example 4

A multi-layer preform and a multi-layer bottle were obtained in the same manner as in Example 2 but using a polyethylene terephthalate (PET) (J-125T, produced by Mitsui Kagaku Co.) having a solubility parameter of 10.7 as a thermoplastic resin, and were confirmed and measured in the same manner as in Example 2. The results were as shown in Table 2.

Example 5

A multi-layer preform and a multi-layer bottle were obtained in the same manner as in Example 2 but using a copolymerized polyester (B-Resin, produced by Mitsui Kagaku Co.) having barrier property and a solubility parameter of 10.7 as a thermoplastic resin, and were confirmed and measured in the same manner. The results were as shown in Table 2.

Comparative Example 4

A multi-layer preform was obtained in the same manner as in Example 2 but using the above-mentioned polybutadiene as an organic oxidizing component. However, the preform could not be blow-molded, and the multi-layer bottle was not obtained. The preform was confirmed and measured in the same manner as in Example 2. The results were as shown in Table 2.

Comparative Example 5

A multi-layer preform was obtained in the same manner as in Example 2 but using, as a transition metal catalyst, the cobalt neodecanoate in an amount of 200 ppm calculated as cobalt and a hydroxyl group-modified polybutadiene (R-45HT, produced by Idemitsu Sekiyu Co.). However, the preform could not be blow-molded, and the multi-layer bottle was not obtained. The preform was confirmed and measured in the same manner as in Example 2. The results were as shown in Table 2.

TABLE 2

| | Moldability of preform | Moldability of bottle | Amount of dissolved $O_2$ (ppb) | Minimum length of dispersant (nm) |
|---|---|---|---|---|
| Ex. 2 | ○ | ○ | 373 | ≦300 |
| Ex. 3 | ○ | ○ | 408 | ≦400 |
| Ex. 4 | ○ | ○ | 343 | ≦300 |
| Ex. 5 | ○ | ○ | 351 | ≦300 |
| Comp. Ex. 4 | X | X | — | note 5) |
| Comp. Ex. 5 | note 6) | note 6) | — | ≦600 | note 4) ○: favorably molded, good appearance X: poorly molded, poor appearance
note 5) gels of the order of microns were formed much.
note 6) undulated, poor appearance Example 6

By opening a humidity-proof package and by using a T-die extruder (produced by Toshiba Kikai Co.) maintaining the T-die temperature at 270° C., a film having a thickness of 20 μm was formed from a resin composition of a polymetaxylyleneadipamide resin (T-600, AEG=87 eq/10⁶ g, produced by Toyo Boseki Co.) dried under a pressure of not higher than 1 mmHg and a temperature of 150° C. for 4 hours containing 5% by weight of a maleic acid-modified polybutadiene (M-2000-20 produce by Nihon Sekiyu Kagaku Co.) as an organic oxidizing component and 400 ppm of a cobalt neodecanoate (DICNATE 5000 produced by Dainihon Ink Kagaku Kogyo Co.) as a transition metal catalyst. A multi-layer film was formed by dry-laminating a biaxially stretched polyester film having a thickness of 12 μm on one surface of the film and an unstretched polypropylene film having a thickness of 50 μm on the other surface thereof by using a laminator. The multi-layer film was heat-sealed onto the opening of the above-mentioned HIRETOFLEX container and was preserved under the conditions of 30° C. and 80% RH for 30 days to measure the amount of oxygen permeated into the container.

Example 7

A film was formed under the same conditions as those of Example 6 but using 5% by weight of a hydroxyl group-terminated polyisoprene (Poly ip produced by Idemitsu Sekiyu Kagaku Co.) as an organic oxidizing component and 310 ppm of the above-mentioned cobalt neodecanoate as a transition metal catalyst calculated as cobalt, to measure the amount of oxygen permeated into the container.

Example 8

A film was formed under the same conditions as those of Example 6 but setting the AEG concentration of the polymetaxylyleneadipamide resin to be 52 eq/10⁶ g, to measure the amount of oxygen permeated into the container.

Example 9

A film was formed under the same conditions as those of Example 6 but using the above-mentioned cobalt neodecanoate as a transition metal catalyst in an amount of 350 ppm calculated as cobalt, to measure the amount of oxygen permeated into the container.

Example 10

A film was formed under the same conditions as those of Example 6 but using the hydroxyl group-terminated polyisoprene as an organic oxidizing component in an amount of 3% by weight, to measure the amount of oxygen permeated into the container.

Example 11

A film was formed under the same conditions as those of Example 6 but using the maleic acid-modified polybutadiene as an organic oxidizing component in an amount of 8% by weight, to measure the amount of oxygen permeated into the container.

Comparative Example 6

A film was formed under the same conditions as those of Example 6 but setting the AEG concentration of the polymetaxylyleneadipamide resin to be 27 eq/10⁶ g, to measure the amount of oxygen permeated into the container.

Comparative Example 7

A film was formed under the same conditions as those of Example 6 but using the cobalt neodecanoate as a transition metal catalyst in an amount of 80 ppm calculated as cobalt, to measure the amount of oxygen permeated into the container.

Comparative Example 8

A film was formed under the same conditions as those of Example 6 but using the maleic acid-modified polybutadiene as an organic oxidizing component in an amount of 12% by weight.

Table 3 shows the results of the measurement.

TABLE 3

| | Amount of $O_2$ permeation (cc/container) note 7) | | |
|---|---|---|---|
| | No treatment | Boiled | Moldability |
| Ex. 6 | 0 | 0 | good |
| Ex. 7 | 0.15 | 0.15 | good |
| Ex. 8 | 0 | 0 | good |
| Ex. 9 | 0 | 0 | good |
| Ex. 10 | 0.12 | 0.12 | good |
| Ex. 11 | 0 | 0 | good |
| Comp. Ex. 6 | 0.26 | 0.36 | good |
| Comp. Ex. 7 | 0.25 | 0.37 | good |
| Comp. Ex. 8 | — | — | film could not be formed | note 7) Measured in compliance with (1)-② above.

Example 12

A resin composition of a polymetaxylyleneadipamide resin having a amino end group concentration AEG of 87 eq/10⁶ g containing 5% by weight of a maleic acid-modified polybutadiene and 310 ppm of a cobalt neodecanoate calculated as cobalt, was fed into an extruder for forming an intermediate layer, a polyethylene terephthalate resin was fed into an extruder for forming inner and outer layers, and a maleic acid-modified ethylene-butene-1 copolymer was fed into an extruder for an adhesive, thereby to form a multi-layer sheet at a multi-layer die temperature of 270° C. By using this multi-layer sheet, a cup-like container was obtained relying upon the plug-assisted compressed air molding method, the cup-like container having a layer constitution of 120-μm inner layer/20-μm adhesive layer/20-μm intermediate layer/20-μm adhesive layer/120-μm outer layer, and a height of 150 mm, a mouth diameter of 60 mm and a volume of 300 ml. A closure having an aluminum foil laminated thereon was heat-sealed onto the mouth of the container. After preserved under the conditions of 30° C. and 80% RH for 30 days, the amount of oxygen permeated into the container was measured.

Example 13

A polyethylene terephthalate resin having an inherent viscosity of 0.83 dl/g was fed into an injector for forming inner and outer layers. Pellets obtained by pelletizing, by using a twin-screw extruder, a resin composition of a polymetaxylyleneadipamide resin (T600, AEG=87 eq/$10^6$ g produced by Toyo Boseki Co.) dried under the same conditions as those in Example 1 onto which has been deposited a maleic acid-modified polybutadiene (5 wt %, M-2000-20, produced by Nihon Sekiyu Co.) and a cobalt neodecanoate (DICNATE 5000 produced by Dainihon Ink Kagaku Kogyo Co.) in an amount of 400 ppm calculated as cobalt, was fed to an injector for forming an intermediate layer. The resins were molded by being co-injected into an injection metal mold under the conditions of a temperature of the injection nozzles of 280° C. and a resin pressure of 250 kgf/cm$^2$ to obtain a two-material-three-layer preform having the inner and outer layers of the polyethylene terephthalate resin, and the intermediate layer of the polymetaxylyleneadipamide resin. The multi-layer preform possessed a weight of 32 g, the intermediate layer thereof having a volume ratio of 6%. The multi-layer preform was heated at 110° C., and was biaxially stretched and blown in a metal mold heated at 150° C. to form a multi-layer bottle having a volume of 500 cc. The multi-layer bottle was sealed at the mouth portion, boiled at 85° C. for 30 minutes, and was preserved under the conditions of 30° C. and 80% RH for 60 days to measure the concentration of oxygen in the container.

Example 14

A multi-layer preform was molded under the same conditions as those of Example 13, and was biaxially stretched and blown in a metal mold heated at 60° C. to obtain a multi-layer bottle having a volume of 500 cc. The multi-layer bottle was sealed at its mouth portion and was preserved under the conditions of 30° C. and 80% RH for 60 days to measure the concentration of oxygen in the container.

The results of measurement were as shown in Table 4.

TABLE 4

| | Amount of O$_2$ permeation (cc/container) note 8) | | |
|---|---|---|---|
| | No treatment | Boiled | Moldability |
| Ex. 12 | 0 | — | good |
| Ex. 13 | — | 0 | good |
| Ex. 14 | 0 | — | good | note 8) Measured in compliance with (1)-② above.

Example 15

An oxygen-absorbing layer was formed by using melt-kneaded pellets of a poly(m-xylyleneadipamide) (T-600, produced by Toyobo Co.) pelletized by using a twin-screw extruder, 5 wt % of a maleic acid-modified polybutadiene (M-2000-20, produced by Nihon Sekiyu Co.) and 310 ppm (calculated as cobalt) of a cobalt neodecanoate (DICNATE 5000, produced by Dainihon Ink Kagaku Kogyo Co.). A two-material-five-layer preform was obtained having a layer constitution of PET/oxygen-absorbing layer/PET/oxygen-absorbing layer/PET, and was biaxially stretched and blown under same conditions as those in Example 13, at stretching ratios of 2.4 times as great in the longitudinal direction, 2.9 times as great in the transverse direction and 6.96 times as wide in area, to obtain a two-material-five-layer bottle.

Example 16

A two-material-five-layer bottle was molded under the same conditions as those of Example 15 but maintaining the metal mold temperature at 180° C. and effecting the heat-setting for 2.5 seconds, and was evaluated in the same manner as in Example 15.

Example 17

The preform same as that of Example 15 was heated at 100° C., and was biaxially stretched and blow-molded at stretching ratios of 3.3 times as great in the longitudinal direction, 3.5 times as great in the transverse direction and 11.55 times as wide in area by using a primary blow metal mold, in order to obtain a primary blow-molded article of a size larger than a final blow-molded article.

Next, the bottom portion, barrel portion and shoulder portion of the primary blow-molded article were shrunk by being heated in an oven heated at 800° C. for 5 seconds.

In this case, the surface temperature of the molded article was 150° C. in average.

Finally, the primary blow-molded article was biaxially stretched and blow-molded by using a secondary metal mold maintained at 180° C., and was heat-set for 2.5 seconds to obtain a two-material-five-layer bottle to evaluate it.

The multi-layer bottles of Examples 15 to 17 were evaluated to have permitted the permeation of oxygen in small amounts, and to have been shrunk little. The bottles had not been deformed as the parting after the biaxial stretching and blow-molding is excellent.

Comparative Example 9

A two-material-five-layer bottle was molded under the same conditions as those of Example 15 but without effecting the heat-setting in conducting the biaxial stretching and blow-molding in Example 15, and was evaluated.

As a result, it was learned that the amount of oxygen permeation and the shrinking of the container were larger than those of the multi-layer bottles of the above-mentioned Examples.

Comparative Example 10

A two-material-five-layer bottle was molded under the same conditions as those of Example 15 but effecting the heat-setting at a temperature of 130° C. for 2.5 seconds in conducting the biaxial stretch blow-molding in Example 15, and was evaluated.

As a result, like in the above Comparative Example 9, it was learned that the amount of oxygen permeation and the shrinking of the container were larger than those of the multi-layer bottles of the above-mentioned Examples.

Comparative Example 11

A two-material-five-layer bottle was molded under the same conditions as those of Example 15 but effecting the heat-setting at a temperature of 180° C. for 6.0 seconds in conducting the biaxial stretch blow-molding in Example 15, and was evaluated.

As a result, it was learned that the crystallinity became too large in the inner and outer layers, the bottle poorly parted from the metal mold after an increase in the crystallinity, and the deformation was large after having been parted.

Table 5 shows the crystallinities of the inner and outer layers, loads at the yielding points and the evaluated results of the above-mentioned Examples and Comparative Examples.

Though Table 5 shows none of the crystallinities of the PET layers which are the intermediate layers, amounts of oxygen permeation and the loads at the yielding points thereof in the above-mentioned Examples and Comparative Examples, it should be noted that they assume mean values of the inner and outer PET layers.

TABLE 5

|  | Molding method | Stretch ratio (those of primary blow in the case of 2-step blow) | | | Heat-setting of shaping mold | | Crystallinity (%) | | Load at yield Point (× 10$^7$ Pa) | |
| --- | --- | --- | --- | --- | --- | --- | --- | --- | --- | --- |
|  |  | Longi-tude | Trans-verse | Area | Temp. (° C.) | Time (sec) | Inner layer | Outer layer | Inner layer | Outer layer |
| Example 15 | 1-step blow | 2.4 | 2.9 | 6.96 | 150 | 2.5 | 30 | 32 | 9.8 | 10.6 |
| Example 16 | 1-step blow | 2.4 | 2.9 | 6.96 | 180 | 2.5 | 35 | 37 | 10.2 | 10.5 |
| Example 17 | 2-step blow | 3.3 | 3.5 | 11.55 | 180 | 2.5 | 53 | 54 | 11.6 | 11.9 |
| Comp. Ex. 9 | 1-Step blow | 2.4 | 2.9 | 6.96 | none | | 26 | 17 | 8.1 | 8.0 |
| Comp. Ex. 10 | 1-step blow | 2.4 | 2.9 | 6.96 | 130 | 2.5 | 27 | 30 | 8.5 | 9.8 |
| Comp. Ex. 11 | 1-step blow | 2.4 | 2.9 | 6.96 | 180 | 6.0 | 56 | 57 | — | — |
| Comp. Ex. 12 | 2-step blow | 3.3 | 3.5 | 11.55 | 180 | 6.0 | 59 | 59 | — | — |

| | Evaluation | | | |
| --- | --- | --- | --- | --- |
| | O$_2$ permeation (cc/month · bottle) | Shrinking factor (%) | Parting | Deformation after parting |
| Example 15 | 0.18 | 1.00 | ◯ | no |
| Example 16 | 0.17 | 0.70 | ◯ | no |
| Example 17 | 0.10 | 0.05 | ◯ | no |
| Comp. Ex. 9 | 0.42 | 9.00 | ◯ | no |
| Comp. Ex. 10 | 0.32 | 5.00 | ◯ | no |
| Comp. Ex. 11 | — | — | × | large |
| Comp. Ex. 12 | — | — | × | large |

Comparative Example 12

A two-material-five-layer bottle was molded under the same conditions as those of Example 17 but effecting the heat-setting at a temperature of 180° C. for 6.0 seconds in conducting the biaxial stretch blow-molding in Example 17, and was evaluated.

As a result, it was learned that the crystallinity became too large in the inner and outer layers, the bottle poorly parted from the metal mold after an increase in the crystallinity, and the deformation was large after having been parted.

In Comparative Examples 11 and 12 above, the crystallinities after having been parted were so high that the amounts of oxygen permeation and the shrinking factors of the containers became obviously equal to, or smaller than, those of the above-mentioned Examples despite they were measured neglecting the deformation of the multi-layer bottles after having been parted. Therefore, the amounts of oxygen permeation and the shrinking factors of the containers were not dared to be measured.

Example 18

Pressure-resistant Container

A two-material-five-layer bottle was molded under the same conditions as those of Example 15 but without effecting the heat-setting, and was evaluated concerning the items shown in Table 6.

Example 19

Heat-resistant Container

The container obtained according to Example 15 was evaluated concerning the items shown in Table 6.

Example 20

Heat-resistant Container

The preform same as that of Example 18 was heated at 100° C., and was biaxially stretched and blow-molded at stretching ratios of 3.3 times as great in the longitudinal direction, 3.5 times as great in the transverse direction and 11.55 times as wide in area by using a primary blow metal mold, in order to obtain a primary blow-molded article of a size larger than a final blow-molded article.

Next, the bottom portion, barrel portion and shoulder portion of the primary blow-molded article were shrunk by being heated in an oven heated at 800° C. for 5 seconds.

In this case, the surface temperature of the molded article was 150° C. in average.

Finally, the primary blow-molded article was biaxially stretched and blow-molded by using a secondary metal mold maintained at 180° C., and was heat-set for 2.5 seconds to obtain a two-material-five-layer bottle to evaluate it.

direction, 2.2 times as great in the transverse direction and 3.96 times as wide in area.

As a result, heat crystallization took place due to the heat-setting, and a thick portion under the neck of the multi-layer bottle became whitened due to the heat though the amount of oxygen permeation has decreased.

Table 6 shows the measured results of half-value widths of peaks of diffraction profiles of the above Examples and Comparative Examples based on the X-ray analysis, as well as the results of evaluation.

TABLE 6

|  |  | Stretch ratio (those of primary blow in the case of 2-step blow) | | | Heat-setting of shaping mold | | Half-valued width (°) of peak of diffraction profile by X-ray diffraction | | | |
|---|---|---|---|---|---|---|---|---|---|---|
|  |  |  |  |  |  |  | Inner layer | | Outer layer | |
|  | Molding method | Long-tude | Trans-verse | Area | Temp. (° C.) | Time (sec) | Circum-ferential direction | Direction of height | Circum-ferential direction | Direction of height |
| Example 18 | 1-step blow | 2.4 | 2.9 | 6.96 | none | | 13.1 | 3.3 | 15 | 4.4 |
| Example 19 | 1-step blow | 2.4 | 2.9 | 6.96 | 150 | 2.5 | 12.8 | 3.5 | 14.5 | 4.2 |
| Example 20 | 2-step blow | 3.3 | 3.5 | 11.55 | 180 | 2.5 | 3.7 | 9.6 | 3.9 | 9.8 |
| Example 21 | 2-step blow | 3.3 | 3.5 | 11.55 | none | | 3.7 | 9.7 | 3.8 | 9.8 |
| Comp. Ex. 13 | 1-step blow | 1.8 | 2.2 | 3.96 | none | | 9.5 | 14.6 | 15.3 | 15.3 |
| Comp. Ex. 14 | 1-step blow | 1.8 | 2.2 | 3.96 | 150 | 2.5 | 9.5 | 15.1 | 15.4 | 15.2 |

Example 21

Pressure-resistant Container

A two-material-five-layer bottle was molded in the same manner as in Example 18 but without effecting the heat-setting in conducting the biaxial stretch blow-molding by using the secondary metal mold, and was evaluated.

Comparative Example 13

Pressure-resistant Container

A multi-layer bottle was molded in the same manner as in Example 18 but effecting the biaxial stretch blow-molding at stretching ratios of 1.8 times as great in the longitudinal direction, 2.2 times as great in the transverse direction and 3.96 times as wide in area.

As a result, the amount of oxygen permeation was large, and a portion under the neck of the multi-layer bottle became thick due to poor stretching.

Comparative Example 14

Heat-resistant Container

A multi-layer bottle was molded in the same manner as in Example 19 but effecting the biaxial stretch blow-molding at stretching ratios of 1.8 times as great in the longitudinal

What is claimed is:

1. A resin composition obtained by blending a xylylene group-containing polyamide resin having an amino end group concentration of not smaller than 40 eq/$10^6$ g with an organic oxidizing component and with a transition metal catalyst, said organic oxidizing component being a polyene having a functional group on a side chain or at a terminal thereof.

2. A resin composition according to claim 1, wherein said xylylene group-containing polyamide resin is a gas-barrier resin having an oxygen permeation coefficient of not larger than 7 cc·mm/$m^2$·day·atm (20° C., 0% RH).

3. A resin composition according to claim 1, wherein said organic oxidizing component is a polybutadiene or a polyisoprene modified with a maleic acid or with an anhydride thereof.

4. A resin composition according to claim 1, wherein said organic oxidizing component is dispersed in the xylylene group-containing polyamide resin, and the dispersant thereof has a minimum length of not larger than 400 nm.

5. A resin composition according to claim 1, wherein said transition metal catalyst is an organic salt of cobalt and is contained at a concentration of not smaller than 300 ppm calculated as a metal.

* * * * *